US008818323B2

(12) United States Patent
Xu et al.

(10) Patent No.: US 8,818,323 B2
(45) Date of Patent: Aug. 26, 2014

(54) METHOD FOR SUPPORTING AN EMERGENCY CALL IN A MOBILE COMMUNICATION SYSTEM

(75) Inventors: Lixiang Xu, Beijing (CN); Chunying Sun, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/001,868

(22) PCT Filed: Jul. 2, 2009

(86) PCT No.: PCT/KR2009/003624
§ 371 (c)(1),
(2), (4) Date: Dec. 29, 2010

(87) PCT Pub. No.: WO2010/002208
PCT Pub. Date: Jan. 7, 2010

(65) Prior Publication Data
US 2011/0117876 A1 May 19, 2011

(30) Foreign Application Priority Data
Jul. 4, 2008 (CN) .......................... 2008 1 0128235

(51) Int. Cl.
*H04W 76/00* (2009.01)
*H04W 4/22* (2009.01)
*H04L 29/06* (2006.01)

(52) U.S. Cl.
CPC .............. *H04W 4/22* (2013.01); *H04L 65/1096* (2013.01); *H04W 76/007* (2013.01); *H04M 2207/18* (2013.01); *H04L 65/1069* (2013.01); *H04M 2242/04* (2013.01)
USPC .............. 455/404.1; 379/37; 379/38; 379/39; 379/40; 379/41; 379/42; 379/43; 379/44; 379/45

(58) Field of Classification Search
CPC ...... H04W 76/007; H04W 4/22; H04W 11/04
USPC .................................... 455/404.1; 379/37–45
See application file for complete search history.

(56) References Cited

U.S. PATENT DOCUMENTS

| 7,215,941 | B2 | 5/2007 | Beckmann et al. |
| 2005/0090224 | A1* | 4/2005 | Dorsey et al. .............. 455/404.1 |
| 2006/0035662 | A1 | 2/2006 | Jeong et al. |
| 2007/0060097 | A1 | 3/2007 | Edge et al. |
| 2008/0076386 | A1* | 3/2008 | Khetawat et al. ............. 455/410 |
| 2008/0207170 | A1* | 8/2008 | Khetawat et al. ............. 455/411 |

FOREIGN PATENT DOCUMENTS

KR  10-2008-0057282 A  6/2008

OTHER PUBLICATIONS

TS 25.331 published Sep. 1999.*

* cited by examiner

*Primary Examiner* — Ajit Patel
*Assistant Examiner* — Michael Irace
(74) *Attorney, Agent, or Firm* — Jefferson IP Law, LLP

(57) ABSTRACT

A method for supporting an emergency call in a mobile communication system is provided, which comprises the steps of: receiving, at a radio resource management entity, a message from a UE indicating that there is an emergency call; setup a RRC connection between the UE and the radio resource management entity; transmitting, by the radio resource management entity, a message to its upper-layer node, the message containing an emergency service indication; and establishing, by the upper-layer node of the radio resource management entity, the emergency call for the UE. With the method for supporting an emergency service in a mobile communication system provided in the present invention, the access failure of an emergency service can be reduced, and the access speed of the emergency service can be increased.

8 Claims, 7 Drawing Sheets

METHOD FOR SUPPORTING AN EMERGENCY CALL IN A MOBILE COMMUNICATION SYSTEM

TECHNICAL FIELD

The present invention relates to the communication field, especially to a method for supporting an emergency call in a mobile communication system.

BACKGROUND ART

The existing structure of the 3rd Generation Mobile Communication System Partnership Project (hereinafter referred to as 3GPP) is shown in FIG. 1. The description of the 3GPP system structure shown in FIG. 1 is given below.

A User Equipment (hereinafter referred to as UE) 101 is a terminal device for receiving data. A Node B 102 is a node responsible for radio transmitting/receiving in a Radio Network Subsystem (RNS). A Controlling Radio Network Controller (hereinafter referred to as CRNC) 103 is a radio network controller which directly controls a Node B. The interface between a Radio Network Controller (hereinafter referred to as RNC) and the UE is known as the air interface. A Serving Radio Network Controller (hereinafter referred to as SRNC) 104 is a RNC which controls bearer information, such as the Radio Resource Control (hereinafter referred to as RRC) status. The interface between the SRNC and the CRNC is the interface known as Iur. A Gateway General Packet Radio Service (the General Packet Radio Service is hereinafter referred to as GPRS) Supporting Node (the Gateway GPRS Supporting Node is hereinafter referred to as GGSN) 105 and a Serving GPRS Supporting Node (hereinafter referred to as SGSN) 106 provide routing function for data transmission. The interface between the SGSN and the RNC is the interface known as Iu. E-PDN 107 is an external public data network providing data source.

The system structure of the System Architecture Evolution (SAE) is illustrated in FIG. 2. The description of the SAE system structure shown in FIG. 2 is given below.

A User Equipment (hereinafter referred to as UE) 201 is a terminal device for receiving data. An EUTRAN 202 (also known as eNB), which is the radio access network of the evolution system SAE, is responsible for providing a LTE (Long Term Evolution) mobile phone with the access to the radio network. The eNB is also connected to a mobility management entity (MME) 203 of the mobile phone and a user plane entity (Serving Gateway) 204 via an interface S1. A MME 203 is responsible for managing mobile contexts and session contexts of the UE and for saving user information on security. Serving Gateway (Serving GW) 204 mainly provides functions of the user plane. An interface S1-MME is responsible for establishing a radio access bearer for the UE and forwarding messages from the UE to the MME via the radio access network. The combined function of the MME 203 and the Serving Gateway 204 is similar to that of the original SGSN 206. Both the MME and the Serving Gateway may be located at the same physical entity. A PDN Gateway 205 is responsible for functions like billing, lawful interception and the like. In addition, both the Serving Gateway and the PDN Gateway may be located at the same physical entity. The SGSN 206 is now configured to provide routing function for data transmission in the UMTS. The existing SGSN is configured to find out the corresponding Gateway GPRS Supporting Node (GGSN) based on an Access Point Name (APN). A HSS 207 is a home subscriber subsystem which is responsible for storing user information including the current location of the UE, the address of a serving node, user information on security, Packet Data Protocol (PDP) context activated by the UE and so on. PCRF 208 provides QoS policies and billing criteria via an interface S7.

In general, a user data stream passes through the PDN Gateway 205 to the Serving Gateway 204 which then transmits the data to the eNB where the UE locates using a GPRS Tunneling Protocol (GTP) channel. The eNB then transmits the data to a corresponding UE.

FIG. 3 shows the structure of the interface 51 in the SAE, where an EPC is a core network of the evolution. Each eNB is connected with a plurality of MMEs in a MME pool. Each eNB is further connected to a plurality of S-GWs in a S-GW Pool.

A HNB (including 3G HNB, LTE HNB and an HNB in another access system) is a Node B applied in a home and can be applied in such a site as a university, a company and so on. The HNB is a Plug-and-Play device, and can be of an open type and a closed subscriber group type. The difference between a HNB of the closed subscriber group type and a common macro base station lies in that typically not all the UEs are permitted to access the HNB. For instance, only UEs which belong to a user's home or are permitted by one of the family members to access the HNB are permitted to access the HNB of the home. For a HNB in a company, only the company's staff and its granted partners are permitted to access the HNB. A HNB group having the same access subscriber set (e.g., HNBs arranged in the same company) is referred to as a CSG (Closed Subscriber Group).

The structure of a 3G HNB is illustrated in FIG. 4, where a UTRAN includes a 3G HNB and a 3G HNB GW. The HNB and the HNB GW constitute a HNB RAN. The 3G HNB performs the functions of an original Node B and some functions of the RNC, such as RRC, RLC, MAC, etc. The 3G HNB GW, which is a node connected to the core network, includes the functions of a NNSF. The interface between the HNB and the HNB GW is known as Iuh. The 3G HNB GW accesses the core network via the Iu interface.

The HNB or the HNB GW can perform the access control of the UE. The HNB or the HNB GW stores a list of UEs identity which the HNB is permitted to access. When the HNB RAN receives a message from UE, it is determined whether the UE is permitted to be accessed or not based on the UE's IMSI. If no IMSI is contained in the received message, the HNB RAN can transmit an identification request message to the UE. The UE'S IMSI can be obtained once a response message from the UE is received. There is no final conclusion on which one of the HNB and the HNB GW is more suitable to perform the access control of the UE. By far, most companies support a decision that the HNB GW should perform the access control of the UE, e.g., the access of the UE is permitted or not.

In existing communication systems, after a radio resource management entity (such as a HNB, a RNC or an eNB) receives a Radio Link Setup Request message from a UE, it is known that there is an emergency service based on the information element Establishment Cause in the message. However, the upper-layer node (e.g., a SGSN or a HNB GW) of the radio resource management entity does not know that the service to be accessed is an emergency service. Therefore, the upper-layer node of the radio resource management entity may perform the access control of the UE, which may result in a failure or delay of the access of the emergency service.

DISCLOSURE OF INVENTION

Technical Solution

An object of the present invention is to provide a method for supporting an emergency service in a mobile communication system. By including emergency service indication in the first message transmitted by a radio resource management entity to its upper-layer node to inform its upper-layer node that the service to be accessed is an emergency service, its upper-layer node can thus treat the service as an emergency one such that the resources allocation to the service can be prioritized without access control.

To achieve the object mentioned above, a method for supporting an emergency call in a mobile communication system is provided, the method comprising the steps of:

receiving, at a radio resource management entity, a message from a UE indicating that there is an emergency call;

setup a RRC connection between the UE and the radio resource management entity;

transmitting, by the radio resource management entity, a message to its upper-layer node, the message containing emergency service indication;

the upper-layer node does not perform access control in case radio resource management entity indicating emergency service; and establishing, by the upper-layer node of the radio resource management entity, the emergency call for the UE.

With the method for supporting an emergency service in a mobile communication system provided in the present invention, the access failure of an emergency service can be reduced, and the access speed of the emergency service can be increased.

MODE FOR THE INVENTION

Figure 1:
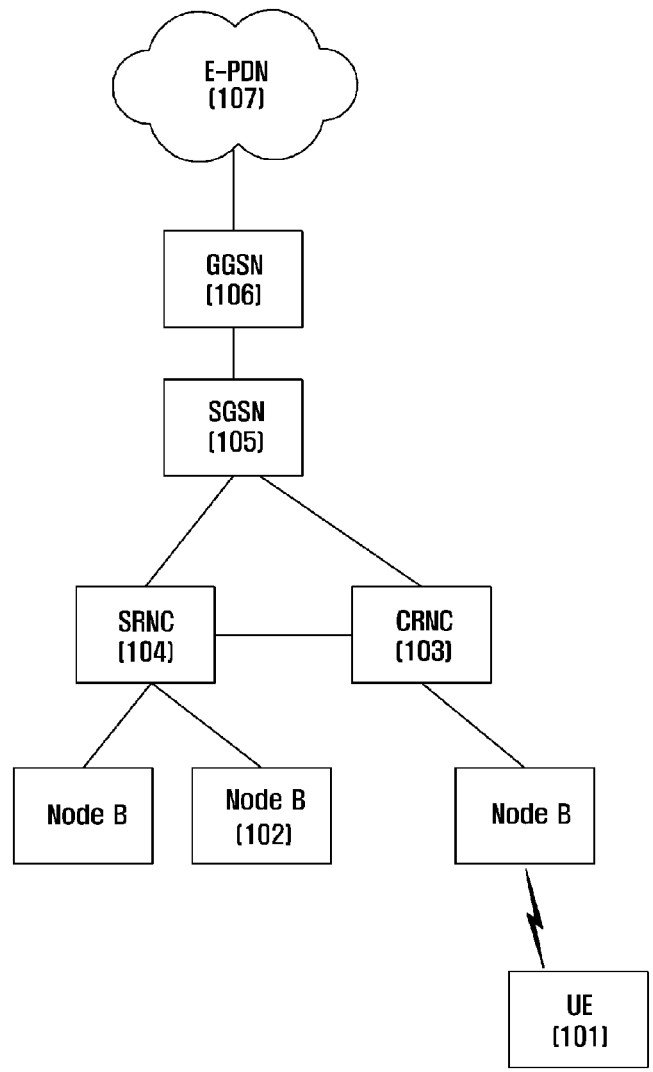
FIG. 1 shows the existing 3GPP system structure.
Figure 2:
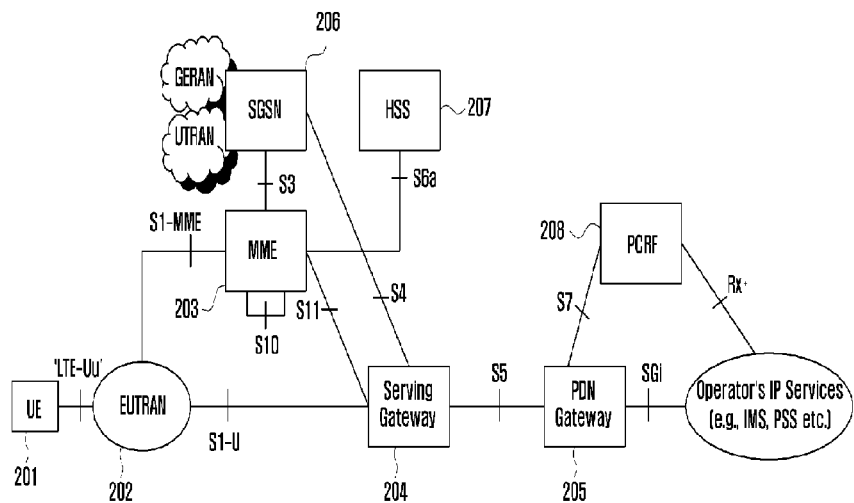
FIG. 2 shows the structure of a SAE system network.
Figure 3:
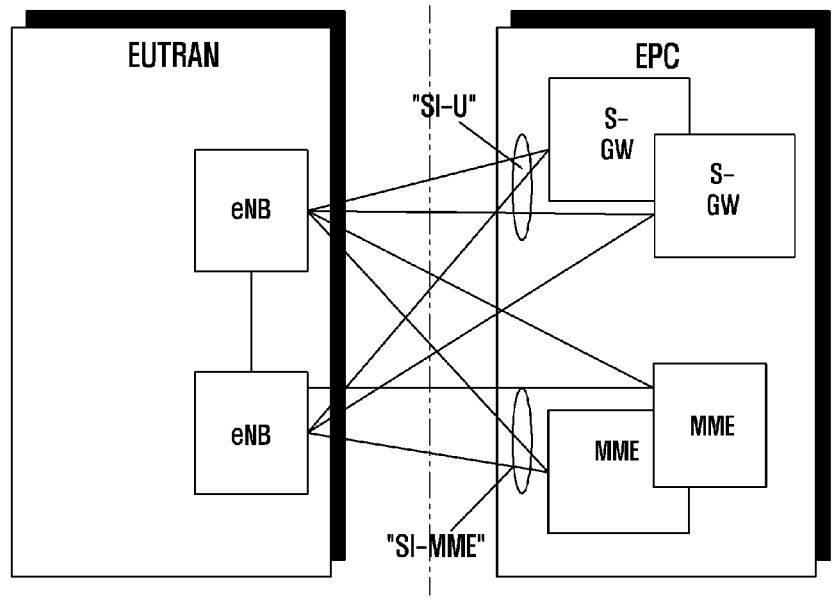
FIG. 3 shows the structure of the S1 interface.
Figure 4:
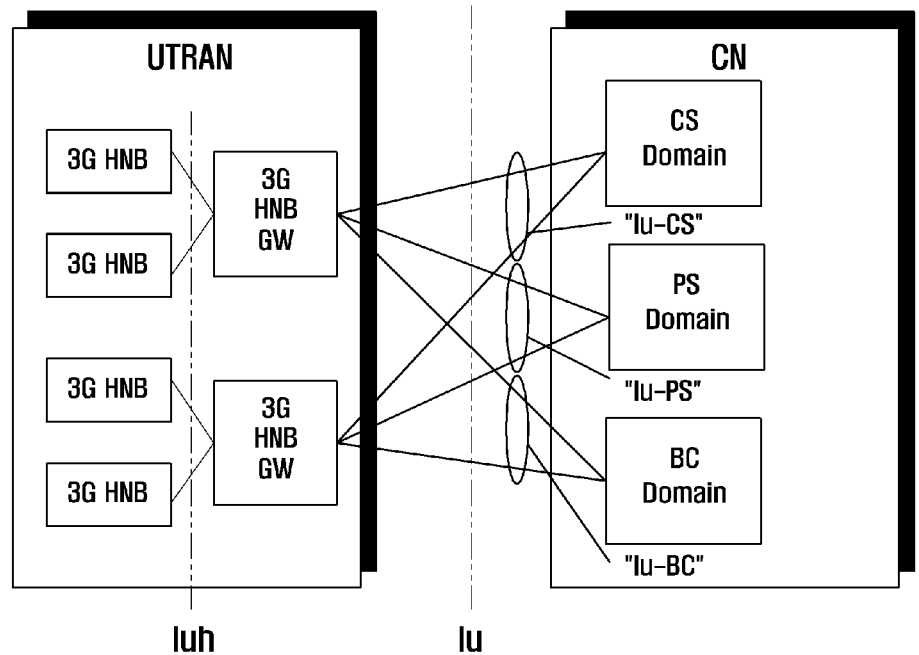
FIG. 4 shows the structure of a 3G HNB.
Figure 5:
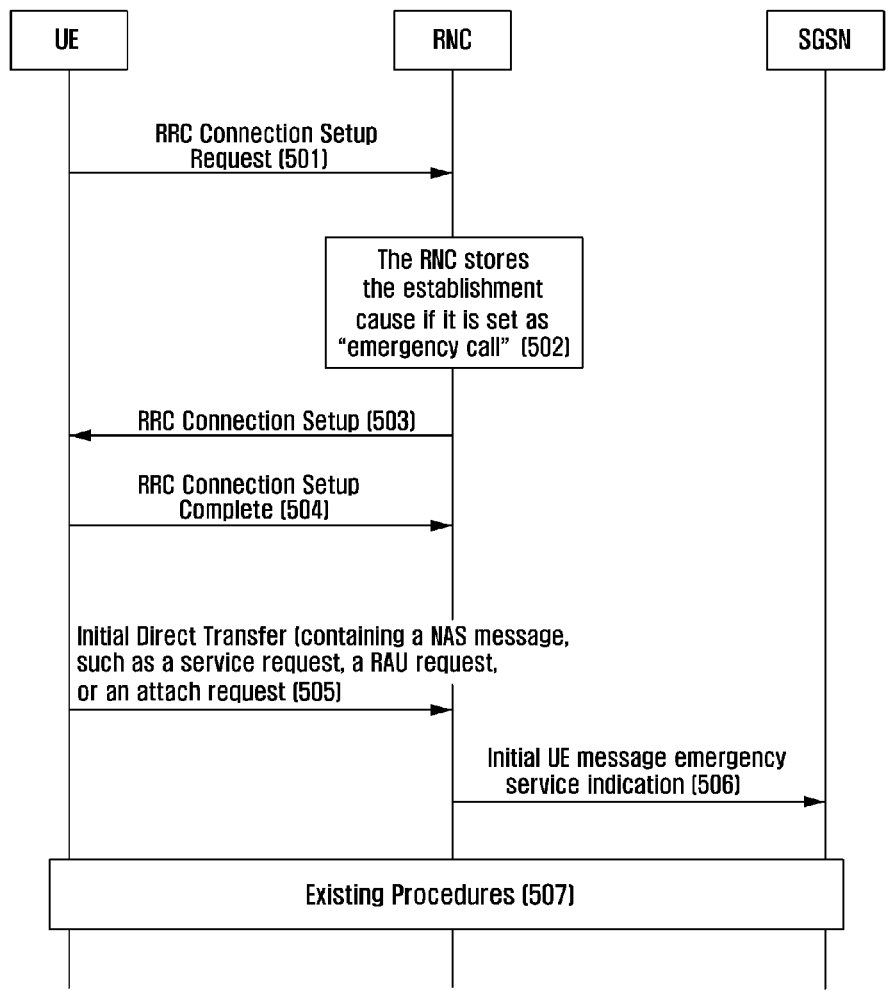
FIG. 5 shows the method for informing a SGSN of an emergency service in a 3G system.

FIG. 5 shows an embodiment in which the present method is applied in a 3G system. The detailed description of this embodiment is given below. Here, detailed technical descriptions irrelevant to the present invention are omitted.

A UE operating in an idle mode desires to initiate an emergency service. Therefore, it initiates a RRC connection setup process. A UE transmits 501 a RRC Connection Setup Request message to a RNC, in which the information element Establishment Cause is set as "emergency call". After receiving the message, the RNC stores the establishment cause if it is set as "emergency call". In any other cases, the necessity for the RNC to store the establishment cause is irrelevant. It is not necessary for the RNC to perform the access control of the UE based on whether the UE is authorized to be accessed or not (for example, it is not necessary to determine whether the UE is permitted to access the current cell). The present invention does not focus on the access control of services based on the status of radio resource. The RNC transmits 503 a RRC Connection Setup message to the UE which then transmits 504 a RRC Connection Setup Complete message to the RNC. The UE transmits 505 an Initial Direct Transfer message to the RNC, which contains a Non-Access Stratum (NAS) message, such as a service request, a Routing Area Update (RAU) request, or an attach request, etc.

The RNC transmits 506 an Initial UE message to the SGSN. The message contains Emergency Service Indication, which is only present when the establishment cause for the RRC connection is set as "emergency service". The message further contains the NAS message in 505.

The SGSN then receives the Initial UE message. If there is an emergency service indication in the received message, it is not necessary for the SGSN to perform the access control of the UE based on whether the UE is authorized to be accessed (e.g., it is not necessary to determine whether the UE is permitted to access the current service area which comprises a routing area (RA) and a location area (LA)).

The SGSN performs 507 the existing procedures according to the NAS message received in 506. For example, if the message received in step 506 is a service request message, the SGSN determines whether to transmit a service accept message (a NAS message) to the UE or not according to the prior art, and then initiates a Radio Access Bearer (RAB) setup procedure. If the message received in 506 is a Routing Area Update Request message, the SGSN transmits a RAU Accept message (a NAS message) to the UE. All these procedures are the same as the prior art, and detailed technical descriptions are therefore omitted here. The transmission of the NAS message from the SGSN to the UE is performed using a direct transfer message via the Iu interface and a Downlink Direct Transfer message via the air interface.

Figure 9:
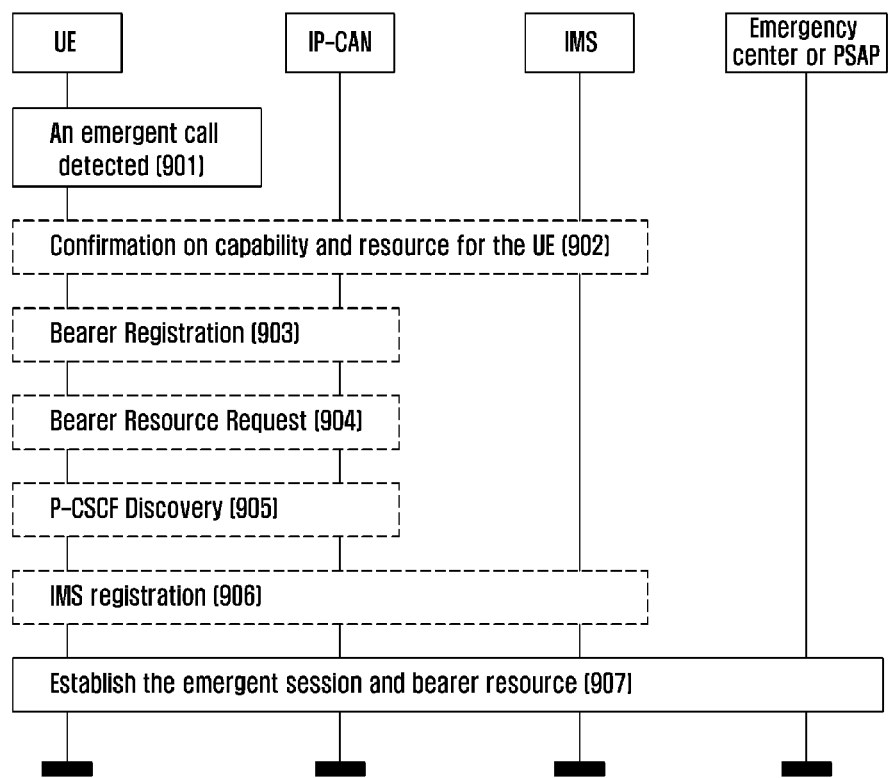
FIG. 9 shows the access flow of an IMS emergency service.

If the emergency call to be accessed is an IMS emergency service, it is required to exchange IMS signalling between the UE and IMS entities, as illustrated in FIG. 9.

Figure 6:
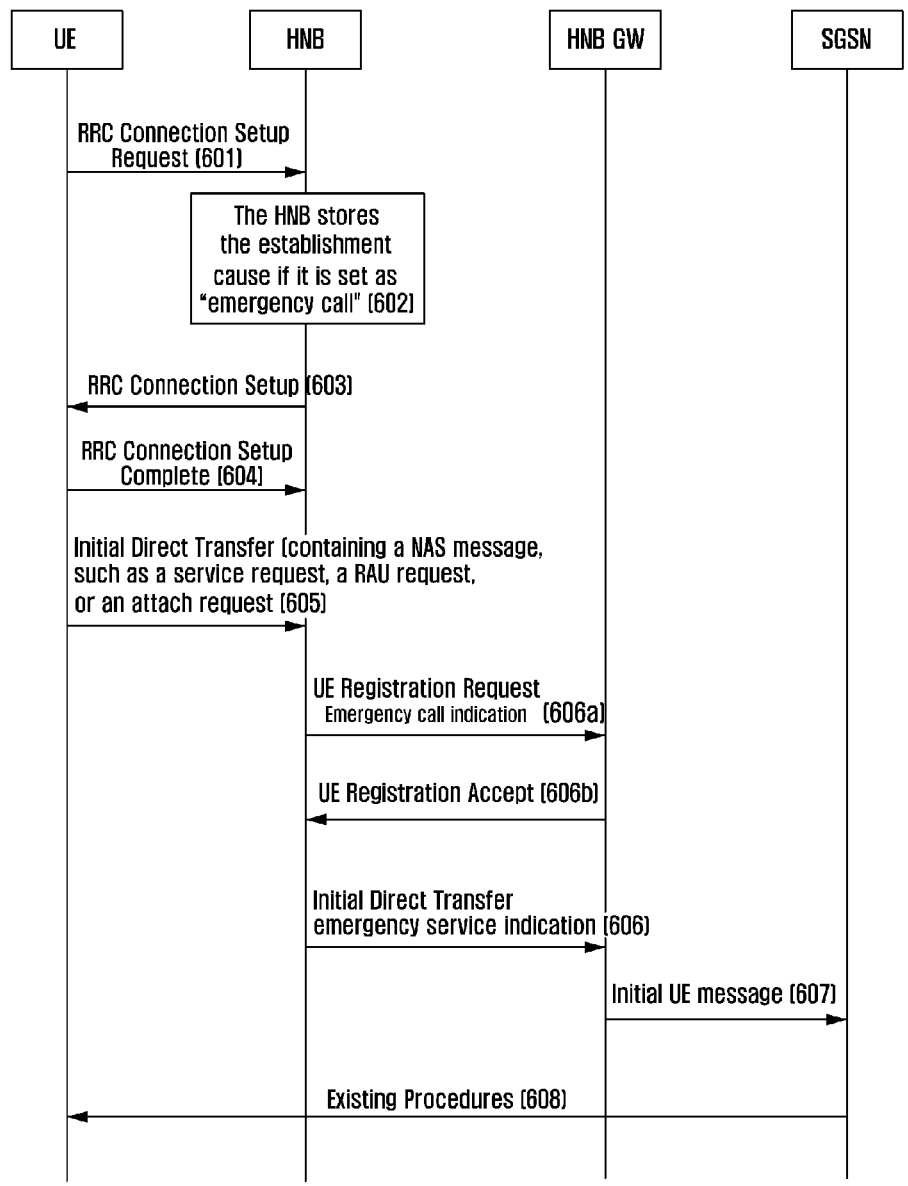
FIG. 6 shows the method for informing a HNB GW of an emergency service in a 3G system.

FIG. 6 shows an embodiment in which the present method is applied in a 3G HNB system. The detailed description of this embodiment is given below. Here, detailed technical descriptions irrelevant to the present invention are omitted.

A UE operating in an idle mode desires to initiate an emergency service. Therefore, it initiates a RRC connection setup process. A UE transmits 601 a RRC Connection Setup Request message to a HNB, in which the information element Establishment Cause is set as "emergency call". After receiving the message, the HNB stores the establishment cause if it is set as "emergency call". In any other cases, the necessity for the HNB to store the establishment cause is irrelevant. It is not necessary for the HNB to perform the access control of the UE based on whether the UE is authorized to be accessed or not (for example, it is not necessary to determine whether the UE is permitted to access the current HNB cell). The present invention does not focus on the access control of services based on the status of radio resource. The HNB transmits 603 a RRC Connection Setup message to the UE which then transmits 604 a RRC Connection Setup Complete message to the HNB. The UE transmits 605 a Initial Direct Transfer message to the HNB, which contains a Non-Access Stratum (NAS) message, such as a service request, a RAU request, or an attach request, etc.

The HNB transmits 606 an Initial Direct Transfer message to a HNB GW. The message is an access stratum message between the HNB and the HNB GW, such as a HNBAP (Home Node B Application Protocol) message. The message contains Emergency Service Indication, which is only present when the establishment cause for the RRC connection is set as "emergency service". The message further contains the NAS message in 605. The HNB GW then receives the Initial Direct Transfer message. If there is an emergency service indication in the received message, it is not necessary for the HNB GW to perform the access control of the UE (e.g., it is not necessary for the HNB GW to determine whether the UE is authorized to access the current HNB). Alternatively, if no IMSI of the UE is included in the message, the HNB GW does not need to perform an identification request process to acquire the UE's IMSI from the UE.

Alternatively, the HNB performs a UE registration process prior to transmitting the Initial Direct Transfer message to the HNB GW. For this purpose, 606a, the HNB transmits a UE Registration Request message to the HNB GW, which contains a registration type and a HNB ID. The message further contains a UE ID if the registration type is set as UE. Alternatively, the HNB can transmit an emergency service indication to the HNB GW using the UE Registration Request message. It is not necessary for the HNB GW to perform the access control of the UE (e.g., it is not necessary for the HNB GW to determine whether the UE is authorized to access the current HNB). 606b, The HNB GW accepts the access of the UE and transmits a Registration Accept message to the HNB. Then it goes to step 606. If an emergency service indication is included by the HNB in the UE Registration Request message, it is not necessary to include an emergency service indication in the Initial Direct Transfer message in step 606.

The HNB GW transmits 607 a RANAP message, Initial UE, to the SGSN, which contains a NAS message and, optionally, emergency service indication. After receiving the message, the SGSN does not need to perform the access control of the UE based on whether the UE is authorized to be accessed if there is emergency service indication in the received message (e.g., it is not necessary to determine whether the UE is permitted to access the current service area which comprises a routing area (RA) and a location area (LA)). In this case, the SGSN can prioritize the resource allocation to the emergency service.

The SGSN transmits 608 a downlink NAS message to the UE according to the NAS message received in 607. The transmission of the NAS message from the SGSN to the UE is performed using a direct transfer message via the Iu interface, a direct transfer message via the Iuh interface and a Downlink Direct Transfer message via the air interface.

The SGSN performs 608 the existing procedures according to the NAS message received in 607. For example, if the message received in step 607 is a service request message, the SGSN determines whether to transmit a service accept message (a NAS message) to the UE or not according to the prior art, and then initiates a Radio Access Bearer (RAB) setup procedure. If the message received in 607 is a Routing Area Update Request message, the SGSN transmits a RAU Accept message (a NAS message) to the UE. All these procedures are the same as the prior art, and detailed technical descriptions are therefore omitted here. The transmission of the NAS message from the SGSN to the UE is performed using a direct transfer message via the Iu interface, a direct transfer message via the Iuh interface and a Downlink Direct Transfer message via the air interface.

If the emergency call to be accessed is an IMS emergency service, it is required to exchange IMS signalling between the UE and IMS entities, as illustrated in FIG. 9.

In a case where the HNB GW is included in a LTE HNB structure, the supporting of emergency services in the LTE HNB is the same as that illustrated in FIG. 6. In this case, the functions of the SGSN shown in FIG. 6 are performed in a MME. Step 608 corresponds to the existing procedures in LTE (e.g., the initial context establishment procedure, the radio bearer setup procedure and the TAU accept procedure). If there is no HNB GW in the LTE HNB, the supporting of emergency services in the LTE HNB is the same as that illustrated in FIG. 7.

Figure 7:
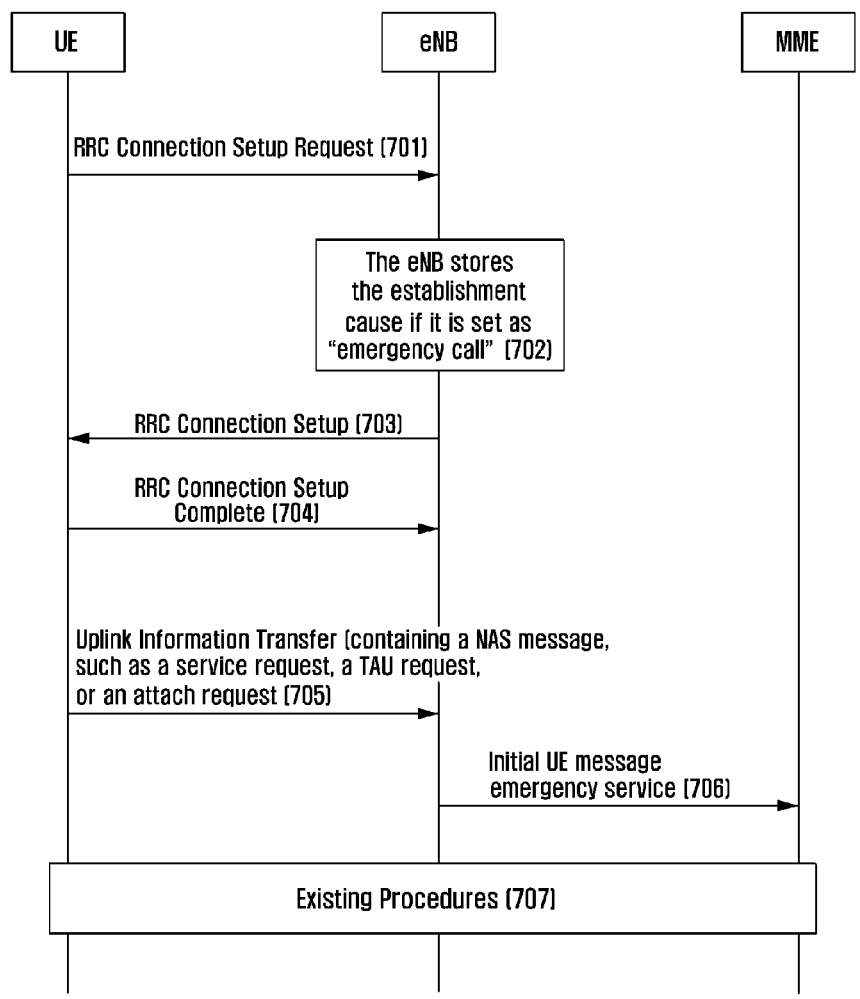
FIG. 7 shows the method for informing a MME of an emergency service in the SAE system.

FIG. 7 shows an embodiment in which the present method is applied in a SAE system. The detailed description of this embodiment is given below. Here, detailed technical descriptions irrelevant to the present invention are omitted.

A UE operating in an idle mode desires to initiate an emergency service. Therefore, it initiates a RRC connection setup process. A UE transmits 701 a RRC Connection Setup Request message to an eNB, in which the information element Establishment Cause is set as "emergency call". After receiving the message, the eNB stores the establishment cause if it is set as "emergency call". In any other cases, the necessity for the eNB to store the establishment cause is irrelevant. It is not necessary for the eNB to perform the access control of the UE based on whether the UE is authorized to be accessed or not (for example, it is not necessary to determine whether the UE is permitted to access the current cell). The present invention does not focus on the access control of services based on the status of radio resource. The eNB transmits 703 a RRC Connection Setup message to the UE which then transmits 704 a RRC Connection Setup Complete message to the eNB. The UE transmits 705 a Uplink Information Transfer message to the eNB, which contains a Non-Access Stratum (NAS) message, such as a service request, a tracking area update (TAU) request, or an attach request, etc.

The eNB transmits 706 an Initial UE message to a MME. The message contains Emergency Service Indication, which is only present when the establishment cause for the RRC connection is set as "emergency service". The message further contains the NAS message in 705.

The MME then receives the Initial UE message. If there is emergency service indication in the received message, it is not necessary for the MME to perform the access control of the UE based on whether the UE is authorized to be accessed (e.g., it is not necessary to determine whether the UE is permitted to access the current service area which comprises a TA, a location area, etc).

The MME performs 707 the existing procedures according to the NAS message received in 706. For example, if the message received in step 706 is a service request message, the MME initiates an initial context setup procedure, including a Radio Access Bearer Setup procedure. If the message received in step 706 is a TAU Request message, the MME transmits a TAU Accept message (a NAS message) to the UE. All these procedures are the same as the prior art, and detailed technical descriptions are therefore omitted here. The transmission of the NAS message from the MME to the UE is performed using a downlink NAS transport message via the S1 interface and a Downlink Information Transfer message via the air interface.

If the emergency call to be accessed is an IMS emergency service, it is required to exchange IMS signalling between the UE and IMS entities. This process is the same as the prior art, and detailed technical descriptions are therefore omitted here.

Figure 8:
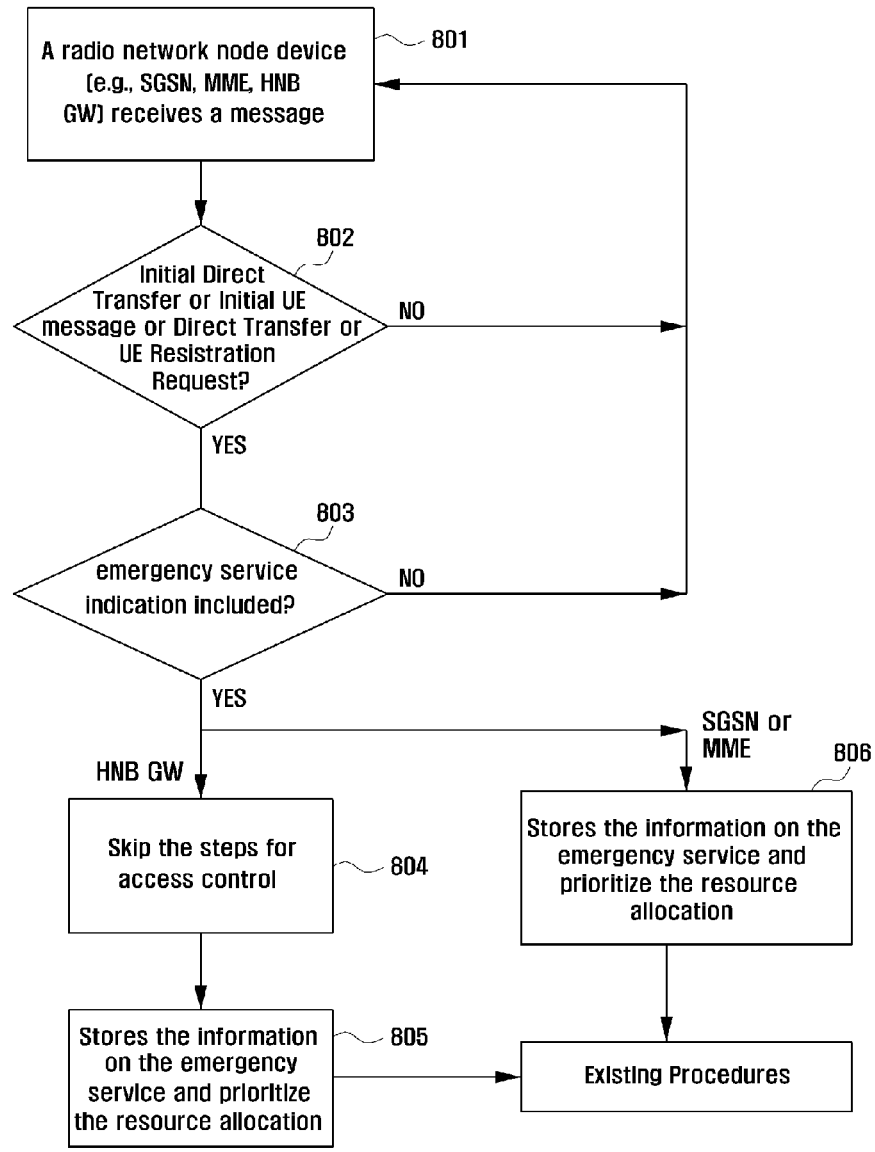
FIG. 8 shows the flow of operations performed in SGSN, MME and HNB GW.

Here, the operation flow of the node which receives the emergency service indication (e.g., the SGSN in FIG. 5, the HNB GW or SGSN in FIG. 6 and the MME in FIG. 7) is illustrated in FIG. 8 whose detailed description will be given in the following. Here, detailed technical descriptions irrelevant to the present invention are omitted.

A radio network node device (e.g., a SGSN, a MME or a HNB GW) receives 801 a message. In a case where the received message is an Initial Direct Transfer message 606 or an Initial UE message 506 or 706 from a radio network resource management entity (e.g., a RNC, an eNB, a HNB or a HNB GW) in step 802 and the message contains an emergency service indication in step 803, the process proceeds with step 804 if the corresponding radio network node device is a HNB GW. Otherwise, the process proceeds with step 806 if the corresponding radio network node device is a SGSN or a MME.

In step 804, if the received message contains emergency service indication, it is not necessary for the HNB GW to perform the access control of the UE (e.g., to check whether the UE is in the registration list of the HNB or not). The HNB GW forwards the received NAS message to a core network node device (e.g., a SGSN or a MME).

Alternatively, in step 805, the HNB GW stores information on the emergency service. If the HNB GW is associated with the resource allocation function, it needs to prioritize the resource allocation to the UE. All other procedures are the same as the prior art, and detailed technical descriptions are therefore omitted here.

In step 806, the SGSN or MME stores the information on emergency service. Alternatively, it is not necessary for the SGSN or MME to perform the access control of the UE based on whether the UE is authorized to be accessed (e.g., it is not necessary to determine whether the UE is permitted to access the current service area which comprises a routing area (RA) and a location area (LA)). The SGSN or MME is required to prioritize the resource allocation to the service to be accessed. All other procedures are the same as the prior art, and detailed technical descriptions are therefore omitted here.

The main operation flow in which an IMS emergency service is detected by the UE is illustrated in FIG. 9 whose detailed description will be given in the following.

A request for establishing an emergency session is detected 901 by the UE.

The following steps 902 through 906 can be skipped under certain conditions.

In step 902, if there is no sufficient resource or capability for the UE to establish an emergency call due to other active sessions, the UE should terminate the current communication to release the preserved bearer resource.

In step 903, if the bearer registration process is required but it has not been performed yet, the UE should perform the bearer registration with an IP-CAN (IP connection access network). Subsequently, the bearer registration process is no longer required.

In this stage, the IP-CAN can assign an IP address to the UE.

In step 904, if it is necessary for the IP-CAN to preserve bearer resource for the transmission of the IMS signalling, the UE should preserve the resource in the IP-CAN. If no IP address is assigned to the UE by the IP-CAN in step 904, the IP-CAN should assign an IP address to the UE during the bearer resource request process.

In step 905, the UE performs a P-CSCF (Proxy-call session control function) discovery process. The P-CSCF in local network suitable for emergency session is discovered by the UE, wherein the detailed P-CSCF discovery method depends on the IP-CAN.

In step 906, if the UE is sufficiently trusted such that it is authorized to verify an IMS network, the UE initiates an IMS emergency registration process. The UE provides the IP address obtained in step 903 or 904 to the P-CSCF selected in step 905. The IP address for signalling is assigned in step 903 or 904 in a synchronous manner. The IMS registration request should contain an emergency common user ID. The implicitly registered emergency common user ID should contain an associated Tel URI (unified resource ID), which is used to call the user back from a PSTN (public switched telephone network). The termination of the requested registration can be set by an S-CSCF (serving CSCF) according to the internal policy of the service system and rule. The subsequent registration procedures are the same as other registration procedures. If the UE is not sufficiently trusted to authenticate an IMS network, it establishes an emergency session with the P-CSCF immediately (as illustrated in step 907) instead of initiating any IMS emergency registration request.

In step 907, if the IMS emergency registration is completed, the UE initiates an IMS emergency session establishment using an IMS session establishment procedure in which an emergency session indicator and an emergency common user ID are incorporated. Otherwise, the UE should initiate an IMS emergency session establishment using an IMS session establishment procedure in which an emergency session indicator and any registered emergency common user ID are incorporated.

From the embodiment shown in FIG. 9, it can be seen that the establishment of the IMS emergency call mainly depends on the IMS signalling. With the method illustrated in FIG. 5, the access stratum of the SGSN is informed that the service to be established is an emergency one and can thereby be treated as an emergency service.

Although the invention has been described in accordance with the embodiments thereof, it is necessary to point out that all these embodiments are used for explanatory purpose only and can not be considered as limitations to the present invention. It will be understood by those skilled in the art that various changes, equivalent alternatives and modifications may be made without departing from the spirit and scope of the present invention defined by the appended claims.

The invention claimed is:

1. A method for supporting an emergency call by a Home NodeB gateway in a mobile communication system, the method comprising:
   receiving, by the Home NodeB gateway, a register request message containing a User Equipment (UE) IDentity (ID) from a Home NodeB;
   determining, by the Home NodeB gateway, whether a UE is allowed to access the Home NodeB based on information included in the register request message; and
   transmitting, by the Home NodeB gateway, if the UE is allowed to access the Home NodeB, a register accept message to the Home NodeB,
   wherein if the register request message contains at least an indication for an emergency call, the UE is allowed to access the Home NodeB,
   wherein the indication for the emergency call is contained in the register request message according to information included in a message received from the UE, and
   wherein the Home NodeB gateway and the Home NodeB are separate devices.

2. A Home NodeB gateway comprising:
   a communication unit configured to receive a register request message for a User Equipment (UE) containing a UE IDentity (ID) from a Home NodeB; and
   a control unit configured to check whether the UE is allowed to access the Home NodeB based on information included in the register request message,
   wherein if the register request message contains at least an indication for an emergency call, the UE is allowed to access the Home NodeB,
   wherein if the UE is allowed to access the Home NodeB, the communication unit transmits a register accept message to the Home NodeB,
   wherein the indication for the emergency call is contained in the register request message according to information included in a message received from the UE, and wherein the Home NodeB gateway and the Home NodeB are separate devices.

3. The method of claim 1, wherein the information includes at least a cause value indicating setup for the emergency call.

4. The method of claim 1, wherein the indication for the emergency service is contained in the register request message when the message received from the UE includes at least a cause value indicating setup for the emergency call.

5. The method of claim 1, wherein the message received from the UE includes at least a Radio Resource Control (RRC) Connection Setup Request Message.

6. The Home NodeB gateway of claim 2, wherein the information includes at least a cause value indicating setup for the emergency call.

7. The Home NodeB gateway of claim 2, wherein the indication for the emergency service is contained in the register request message when the message received from the UE includes at least a cause value indicating setup for the emergency call.

8. The Home NodeB gateway of claim 2, wherein the message received from the UE includes at least a Radio Resource Control (RRC) Connection Setup Request Message.

\* \* \* \* \*